Jan. 16, 1934.   W. D. FOSTER ET AL   1,944,030
CONTROL FOR FILM HANDLING APPARATUS
Filed March 23, 1933   2 Sheets-Sheet 1
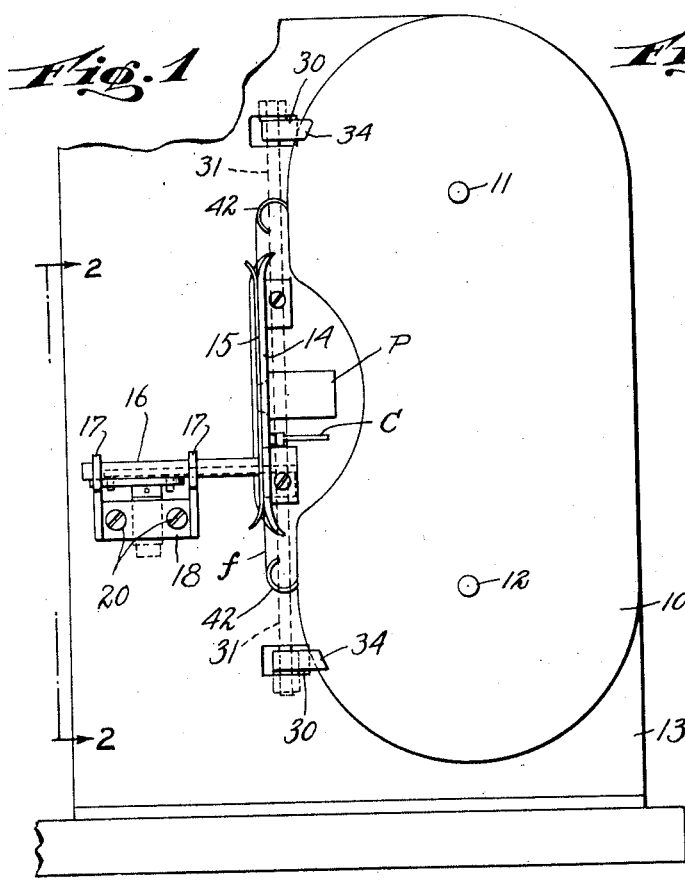
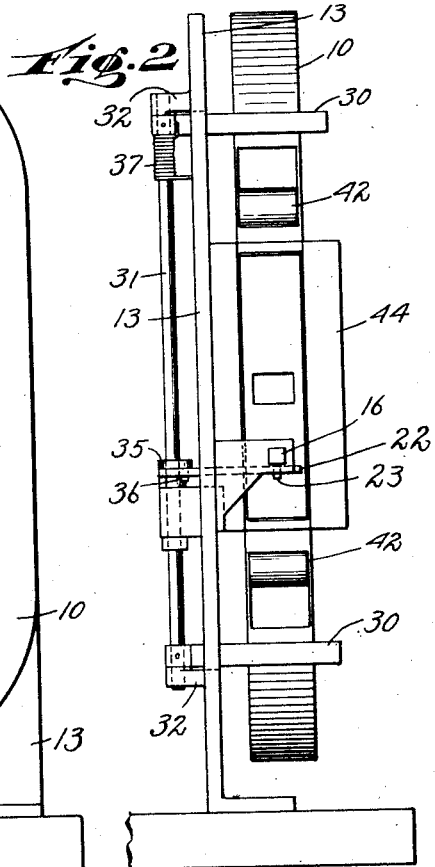
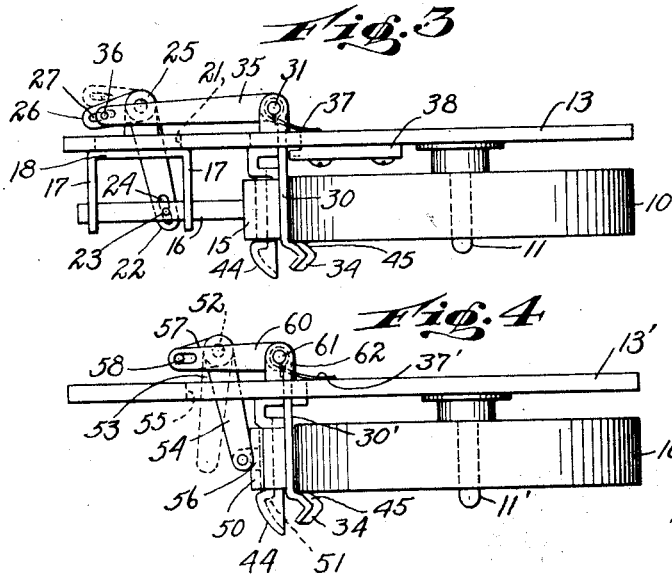
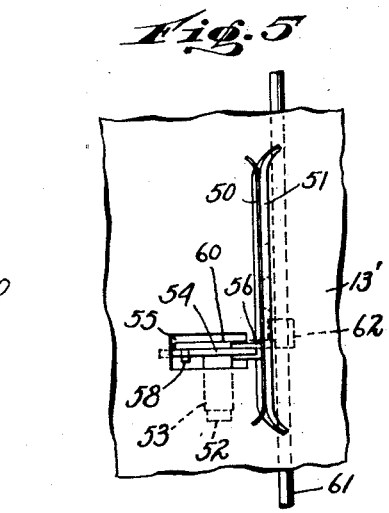
INVENTORS
WARREN DUNHAM FOSTER.
FREDERICK DAVENPORT SWEET.
BY
ATTORNEY.

Jan. 16, 1934.  W. D. FOSTER ET AL  1,944,030
CONTROL FOR FILM HANDLING APPARATUS
Filed March 23, 1933  2 Sheets-Sheet 2
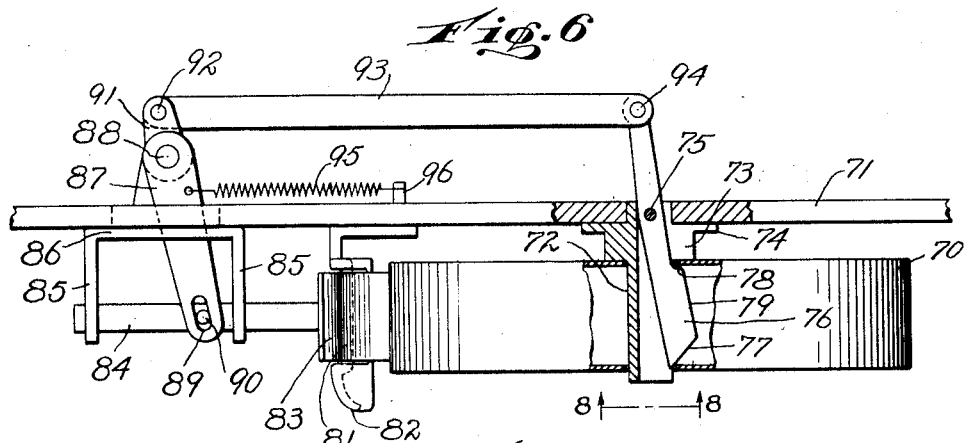
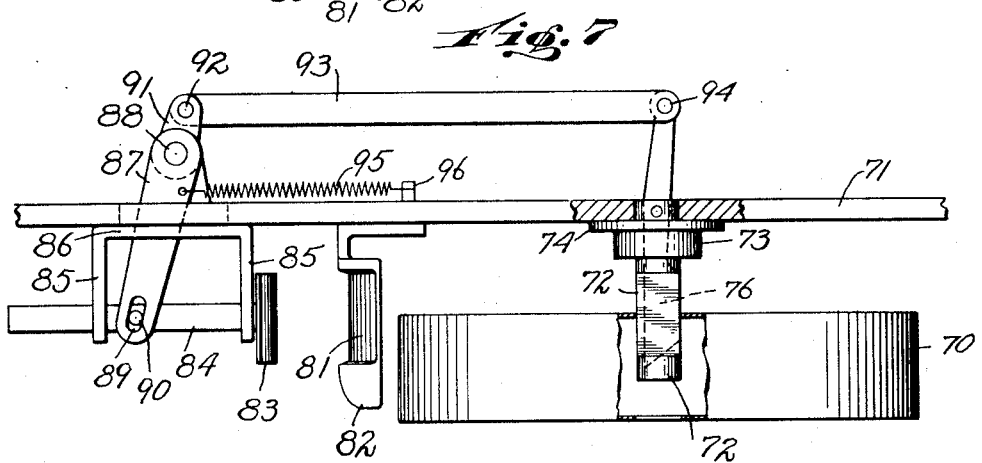
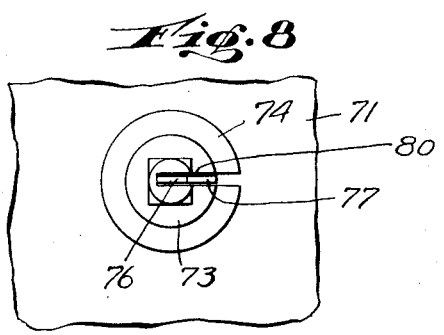
INVENTORS.
WARREN DUNHAM FOSTER.
FREDERICK DAVENPORT SWEET.
BY
ATTORNEY.

Patented Jan. 16, 1934

1,944,030

UNITED STATES PATENT OFFICE 1,944,030

CONTROL FOR FILM HANDLING APPARATUS

Warren Dunham Foster, Washington Township, Bergen County, N. J., and Frederick Davenport Sweet, New York, N. Y., assignors, by direct and mesne assignments, to Kinatome Patents Corporation, a corporation of New York Application March 23, 1933. Serial No. 662,378

22 Claims. (Cl. 88—17)

This invention relates generally to film handling apparatus and more particularly to mechanism for controlling the gate in a film handling apparatus by the movement of the film carrier to or from operative relation to the support therefor provided in the apparatus. According to this invention, when the user places a film carrier, either a magazine or an open reel, upon the spindle or other like means of the apparatus that acts of itself automatically and without attention from him first opens the gate so that the film may be guided therein as he pushes the carrier into place upon the support and when the carrier is completely seated upon the support and the film in place within the gate, the gate is thereupon automatically closed. Alternatively, as the user draws the film carrier off of its support the gate is automatically opened without attention from him until the film has been drawn free from it and thereupon it moves back into closed position.

This invention is particularly useful for carriers of the type in which both the delivery and take-up reels of the film are carried in one structure such as, for example, the double magazine of the Ponting and Ford type such as illustrated in the patent to them, Number 1,440,173, dated December 26, 1922, or to their magazine of the solid type such as is described and claimed in their co-pending application, Serial Number 72,855, filed December 2, 1925, or in any other appropriate magazine. The invention is also particularly applicable to a film handling apparatus, such as described in said last previously mentioned Ponting and Ford application, in which as the magazine is seated upon the film handling apparatus guiding members guide the exposed length of film directly into the gate. In view of the fact that the carrier and the film handling apparatus used therewith are so largely automatic the user is likely to forget that he must manually open the gate before the film is placed therein and close it thereafter before he starts the apparatus in operation, and alternatively that if he draws the magazine off of the spindles before he opens the gate he is likely to injure the film. Such thoughtlessness on the part of the user is rendered without damage in apparatus such as is herein described and claimed. It must of course be understood that the usefulness of this invention is in no way limited to such structures as mentioned above.

In view of the foregoing explanation it is evident that among the chief objects of our invention is the provision of automatic means for opening the gate as the user places a film carrier in operative relation to the apparatus, closing the gate when the film is well within the gate and the carrier is properly seated upon the apparatus, and, after the film has been shown or projected, opening the gate as the user draws the carrier from the apparatus and thereafter automatically closing the gate when the film is again free from it.

Other objects, advantages and characteristics of the present invention are apparent in the following description, the attached drawings and the sub-joined claims. Although we are showing one preferred embodiment of our invention merely for purposes of illustration it is of course understood that we are not limiting ourselves to any particular construction, as changes can readily be made without departing from the spirit of our invention or the scope of our broader claims.

In the drawings:

Figure 1 is a side view of one type of apparatus embodying our invention with a film carrier seated thereupon and the gate closed.

Figure 2 is taken upon the line 2—2 of Figure 1 looking in the direction of the arrows.

Figure 3 is a top plan view corresponding to Figure 1.

Figure 4 resembles Figure 3 but shows a modification of the invention applied to a swinging or pivoted gate and Figure 5 is a side view of the same.

Figures 6, 7 and 8 show the invention as applied to a delivery spindle, upon which an open reel, or a single magazine, may be mounted, the control of the gate being accomplished following contact between the control mechanism and the interior of the spindle receiving opening of the film carrier. Figure 7 corresponds to Figure 6 but shows the gate open. Figures 6 and 7 are top plan views, partially in section. Figure 8 is a detailed view taken upon the line 8—8 of Figure 6 looking in the direction of the arrows.

In the illustration of the invention shown in Figures 1, 2 and 3, a film holder 10 may be placed on a delivery spindle 11 and take up spindle 12, each mounted upon a supporting plate 13 of the film handling apparatus. The gate structure shown for purposes of illustration may have a fixed apertured gate section 14 and a movable apertured gate section 15. In Figures 1 to 3 inclusive the movable gate section 15 is shown as at all times parallel to the fixed gate section 14. In Figures 4 and 5, later described, an angularly movable gate section is shown. Opposite the aperture a prism P is shown, as for cooperation with a light source as in the structure of the last previously above-mentioned application of Ponting and Ford. Obviously, when the invention is applied to a camera, the prism is omitted. A conventional feeding member C is shown. It will of course be understood that our invention may be applied to any film handling machine, as for example projector, camera, or film playing phonograph.

The operating connection between the movable gate section 15 and the film holder 10 may be arranged as follows: To the lower end of the movable gate section 15 may be fastened a rod 16, extending to the left as viewed in Figures 1 and 3, which may be guided by apertures in two bracket members 17 joined to a body portion 18 which may be fastened by screws 20 to the mounting plate 13. A slot 21 may be provided in the mounting plate 13 just below and parallel to the rod 16 and through the slot a lever arm 22 may extend from the rod 16 and be connected thereto by means of a pin 23 fastened in the rod 16, which pin engages in the lengthwise slot 24 provided in the lever arm 22 adjacent its end. The lever arm 22 may be pivoted on a vertical pintle 25 which may be supported on the plate 13 and a lever arm 26, provided with a lengthwise slot 27 adjacent its outer end, may be integrally joined to the lever arm 22 at substantially right angles thereto.

It can be seen by inspection of Figure 3 that rocking the lever 22 on its pivot 25 will move the gate section 15 away from the fixed gate section 14. To rock the lever 22 when the film holder 10 is being initially moved to full operative position on the spindles 11 and 12, we mount one or more gate control arms or actuators 30 on a vertical shaft 31 supported as by lugs 32 found upon the plate 13. Each actuator 30 extends forwardly, as viewed in Figure 3, from its pivot 31 through a slot provided in the plate 13 and along the side wall of the film holder 10. The forward end portion of the actuator 30 is made with a bent cam portion 34 which may be formed substantially as shown in Figure 3. It will be seen by those skilled in mechanics that the cam portion 34 may be formed differently from the way it is shown in Figure 3 and yet will serve satisfactorily for the purpose of this invention. Fastened to the arbor 31 in a plane adjacent the plane of the lever 26 is provided a lever arm 35 the outer end of which terminates adjacent the slotted portion of the arm 26 and carries therein a pin 36 which extends downwardly and engages in slot 27. A spring 37 coiled around the shaft 41 with its end resting against the supporting frame 13 is arranged normally to swing the arm 35 counter-clockwise, thus holding the gate section 15 in closed position against the fixed gate section 14, and also holding the actuator 30 in the Figure 3 position wherein its straight middle portion rests against the film holder 10. When the film holder 10 is not in position on the spindles 11 and 12 the movement of the forward end portion 34 of the actuator 30 is stopped slightly to the right of its Figure 3 position by means of a stop member 38 which may be adjustably fastened on the plate 13 for engaging the straight portion of the actuator 30.

We show an actuator and its accompanying mechanism for each portion—delivery and take-up—of the magazine, but it will be readily understood that in many cases one actuator will be sufficient.

By an inspection of Figure 3 it will be seen that when the inner face of the film holder 10 is brought against the cam portion 34, with the usual openings in the film holder engaging the tip ends of the spindles 11 and 12, the respective edges of the film holder will be in position to cooperate with the cams 34 to swing them both to the left as viewed in Figure 3 as the film holder is moved inwardly toward the supporting plate 13. This first movement of the film holder as it is being seated on the spindles 11 and 12 will therefore, through the above described lever system, move the movable gate section 15 away from the fixed gate section 14 before the stretch of film which extends between two tension guide members 42 will have reached a point opposite the forward or outer edge of the movable gate section. This construction of tension guide members is such as is shown and claimed in the copending application of Warren Dunham Foster, Serial Number 550,778, filed July 14, 1931. It will be noted that the section of the film which lies between the two guide members 42 is guided to position by a curved guide member 44 of the fixed gate section 14 and while the film is passing over this curved guide section 44 the movable gate section 15 is being moved away from the fixed section and will be held opened, as can be seen by inspection of Figure 3, until the film has moved all the way into position between the two gate sections. At this point the outer face of the film holder will have moved beyond the cam portion 34 and the spring 37 will then become effective to swing the lever 35 counter-clockwise and through the above mentioned cooperating parts move the gate section against the fixed gate section 14. At the same time the cam portion 34 will have been swung counter-clockwise in front of the outer face of the film holder 10 until the actuator 30 is brought to rest against the edge of the film holder, thus locking the film holder into position.

After the film has been projected or exposed, or played, it is important that the operator of a motion picture machine open the gate before he moves the film holder from the apparatus. Otherwise he will damage the film. This invention serves equally well to prevent damage occurring to the film when the film holder is being removed from the camera as when the holder is being positioned on the spindles. To secure this advantage, an inner cam face 45 of the cam portion 34 is so constructed that the outer edge of the film holder 10 will at once engage this cam face 45 when the film holder is first moved as it is being drawn off of the spindles 11 and 12. By this arrangement the film holder upon being removed from the apparatus by a simple pulling movement is made effective for swinging the actuators 30 to the left as viewed in Figure 3, thereby moving the gate section 15 away from the gate section 14 at the beginning of the movement of the film holder off of the spindles. As the film holder is pulled away from the spindles the cams 34 engage against the side walls of the film holder and the gate is prevented from closing until the film is entirely out of the gate. Then the gate closes.

In Figures 4 and 5 the application of the invention to a camera or projector which has a movable gate section 50 pivotally mounted for movement toward and away from a fixed gate section 51 mounted on a mounting frame 13' is illustrated. To mount the movable gate section 50 for control by a film holder 10' an arbor 52 is mounted on a lug 53 on a mounting frame 13' and a lever arm 54 is fulcrumed on the arbor 52 and extends forwardly through a slot 55 in the plate 13' to a point opposite the center of the movable gate section 50. The arm 54 is pivotally fastened to a lug 56 on the gate section 50, thereby mounting the gate section 50 for movement about the arbor 52. It will be seen that the gate section 50 may be moved away from the fixed section 51 angularly or in parallelism. A short lever arm 57 may be integrally joined to the lever arm 54 at substantially right angles thereto, and have fixed in its outer end portion a pin 58. An operative connection between the film holder 10 and the pin 58 in the lever 57 may include a lever 60 fulcrumed on a shaft 61 journaled in a lug 62 integral with the plate 13'. The lever 60 may have a short, lengthwise slot in its outer end arranged for engaging the pin 58. The other elements of the above mentioned connection between the film holder 10 and the lever 57 are an actuator 30' and a spring 37' which may be substantial duplicates of the actuator 30 and the spring 37 shown in Figure 3. The operation of the structure shown in Figure 4 will be the same in principle as the structure of Figure 3 described hereinbefore, except that the gate 50 is not moved directly away from the fixed gate section 51, but since the lever 54 and the arbor 52 are positioned so that the angle between the lengthwise axis of the lever 54 and the optical axis of the apparatus is slightly more than a right angle, it will be seen that there will be substantially a rectilinear movement of the gate 50 away from and toward the gate section 51.

The above illustrations of the invention show the actuator as applied to the periphery of a film carrier. Under certain circumstances, as when the film carrier takes the form of an open reel with relatively light flanges, it may be desirable to control the gate opening operation by the periphery of the spindle receiving opening of the carrier. A construction illustrating such an exemplification of the invention is shown in Figures 6, 7 and 8.

A carrier 70 may be either a single enclosed magazine or an open reel. From a supporting frame 71, a fixed spindle 72 may extend. This spindle may include an abutment 73 which limits the inward movement of the reel toward the support and an attaching extension 74. Pivotally mounted upon a pin 75 mounted in the frame 71 is an actuator 76 which extends outwardly from the frame and through the hollow center of the spindle 72. As will be readily seen in Figure 6, this actuator includes two cam surfaces 77 and 78 and the straight portion 79 normally parallel to the axis of the spindle. As the actuator 76 rocks upon the pin 75, the forwardly extending portion, as viewed in the drawings, extends through an appropriate opening 80 in the side of the spindle 72. The purposes of this construction will later be made apparent.

Mounted upon the support 71 is a fixed gate section 81, which includes a forwardly extending film guiding surface 82. A movable gate section 83 may be mounted on a rod 84 which extends through appropriate openings in two forwardly extending arms 85 of the bracket 86, which is shown as attached to the supporting frame 71. To operate the rod 84 a lever 87 may be mounted upon a pintle 88 mounted upon the frame 71 and, passing forwardly through an opening in the frame 71, have in its forward portion, as viewed in the drawings, a slot 89 in which operates a pin 90 placed in the gate operating rod 84. Formed integrally with the lever 87 is a lever 91 which through a pin 92 is operated by the link 93 which through a pin 94 is attached to the rearward end, as viewed in the drawings, of the actuator 76. A spring 95 extending between the lever 87 and a pin 96 placed in the supporting frame 71 tends always to close the gate and to move the parts from the position shown in Figure 7 to that shown in Figure 6.

The operation of the device will be readily understood from the drawings. As the carrier 70 is moved by the user toward the supporting frame 71, the inward of the two spindle-receiving openings of the carrier contacts with the cam surface 77 of the actuator 76. The continued inward movement of the carrier, by contact with this cam surface 77, moves the forward part of the actuator from the position shown in Figure 6 in which the gate is closed to the position shown in Figure 7 in which the gate is open. The further inward movement of the carrier 70 into contact with the abutment 73 maintains the gate open, by contact between the surface 79 and the spindle-receiving opening of the carrier, until said inward opening 70 passes upon and over the cam surface 78. At the point at which the periphery of the opening passes inwardly and beyond the cam surface 78 the spring 95 will be effective to move the actuator 76 back to the position shown in Figure 6 in which it completely closes the gate. In this position, owing to the shape of the actuator 76, there is no frictional contact between the carrier and the actuator.

Upon the opposite movement of the carrier 70 to free the film from the apparatus the cam surface 77 by engagement with the periphery of the inner opening of the carrier 70 will be effective to move the control structure back to the position shown in Figure 7 and to maintain it there until the film is free from the gate. When the carrier has been completely removed, the gate of course will be closed by the movement of the actuator 76 to the position shown in Figure 6.

The usefulness of this type of our invention is particularly great in such cases as the trailing end of the film is permanently attached to a delivery carrier which is formed independently of the take-up carrier, but it is in no way limited to such use.

It will be readily understood that all forms of our invention are useful, not only in opening and closing the gate at appropriate times, but also in keeping the gate closed while the film is being operated. That is to say, the cam surfaces 78 and 45 operate as locking members to maintain the film carrier locked into relation with the apparatus as well as to maintain the gate closed, these locking instrumentalities of course being unitary. It will be understood that although the actuator 76 is not in contact with the carrier when the carrier is fully disposed in the operating position, it is placed very close to an edge of the carrier flange so that it prevents any unwanted lateral movement. A very slight pull, however, of the carrier away from the apparatus is sufficient to render the locking means ineffective and to permit the withdrawal of the film carrier with the concomitant opening of the gate.

The advantages of this invention will be apparent from the drawings, the foregoing portion of this specification, and the subjoined claims.

Other advantages arise from the provision of means by which the gate is opened and closed in timed relation to the bodily movement of the film into and out of operative relation to the apparatus and the provision of unitary locking means for the gate and the film carrier operated by the bodily movement of the film carrier.

We claim:

1. In combination, a film supporting carrier, a film handling apparatus having carrier mounting means, film feeding means, and an openable gate in which a film supported by said carrier may be threaded preparatory to the feeding operation, and means operated by the placing of said carrier upon said mounting means for automatically opening said gate so that the film supported by said carrier may be threaded therein while said carrier is being placed upon said apparatus.

2. In combination, a film supporting carrier, a film handling apparatus having carrier mounting means, film feeding means, an openable gate in which a film supported by said carrier may be threaded preparatory to the feeding operation, and means for opening said gate, said gate-opening means including an openable actuating member disposed adjacent said mounting means at such position that it is engaged and operated by said carrier as said carrier is placed upon said mounting means.

3. In combination, a film supporting carrier, a film handling apparatus having carrier mounting means, film feeding means, an openable gate through which a film supported by said carrier may be threaded preparatory to the feeding operation, said gate including a fixed section and a section movable relatively thereto, and control means for moving said movable section, said control means including an operable actuating member placed adjacent said mounting means and so disposed and formed as to be engaged and operated by said carrier as it is placed upon said mounting means and a connection between said actuating member and said movable gate section for moving said movable section away from said fixed section upon the operation of said actuating member whereby said gate is automatically opened as said carrier is placed upon said mounting means.

4. In combination, a film supporting carrier, a film handling apparatus having carrier mounting means, an openable gate through which a film supported by said carrier may be positioned so that it may be fed therethrough, and film feeding means, and means operated by the movement of said carrier away from said mounting means for the purpose of removing it from said apparatus for automatically opening said gate so that the film supported by said carrier and in feeding position within said gate may be removed therefrom by the act of removing the carrier from the apparatus.

5. In combination, a film supporting carrier, a film handling apparatus having carrier mounting means, an openable gate in which a film supported by said carrier may be positioned so that it may be fed therethrough, and means for opening said gate, said gate-opening means including an actuating member adjacent said mounting means and so disposed and formed as to be engaged and operated by said carrier as it is removed from said mounting means.

6. In combination, a film supporting carrier, a film handling apparatus having a spindle upon which said carrier may be mounted, an openable gate in which a film supported by said carrier may be threaded so that it may be fed therethrough, said gate including a fixed section and a section movable relatively thereto, and means for moving said movable section for the purpose of opening said gate, said gate opening means including an operable actuating member placed adjacent said spindle and so disposed and formed as to be engaged and operated by said carrier as it is moved along the axis of said spindle away from said apparatus and a connection between said actuating member and said movable section for moving said movable section away from said fixed section upon the operation of said actuating member whereby said gate is opened as said carrier is being removed from said spindle.

7. In combination, a film supporting carrier, a film handling apparatus having a spindle upon which said carrier may be mounted, a gate comprising a fixed section and a section movable relatively thereto, and control means for moving said movable section relatively to said fixed section, said control means including an actuating member placed adjacent said spindle and so disposed and formed as to be engaged and operated by said carrier as it is moved along the axis of said spindle and a connection between said actuating member and said movable section for moving said movable section upon the operation of said actuating member.

8. In combination, a film supporting carrier, a film handling apparatus having carrier mounting means, film feeding means, a gate in which a film supported by said carrier may be threaded in order that it may be fed therethrough, said gate including a fixed section and a section movable relatively thereto, and control means for said gate, said control means including an actuating member placed adjacent said mounting means and so disposed as to be engaged by said carrier as it is moved along said mounting means and so formed as to be moved in a first direction by one portion of said movement and moved in another or second direction following a succeeding portion of said movement, and a connection between said actuating member and said movable section for moving said movable section in one direction upon said first movement of said actuating member and for moving said movable section in another direction upon said second movement of said actuating member.

9. In combination, a film supporting carrier, a film handling apparatus having carrier mounting means, an openable gate in which a film supported by said carrier may be threaded preparatory to the feeding operation, and means operated by the placing of said carrier upon said mounting means for first automatically opening said gate during the first portion of such operation of placing said carrier upon said mounting means so that the film supported by said carrier may be threaded therein and for thereafter automatically closing said gate as said carrier is completely seated in operative position upon said apparatus.

10. In a film handling apparatus having an openable gate and threading means for initially guiding a film toward said gate and into a position within said gate, means connected with the film as it is being guided into position and operated by such movement for necessarily opening said gate in preparation for the movement of the film into a place within said gate, and means connected with the film and operated by the movement thereof for necessarily closing said gate after the film has been positioned in said gate.

11. In combination, a film supporting carrier, a film handling apparatus having a spindle upon which said carrier may be mounted, film feeding means, an openable gate in which a film supported by said carrier may be threaded preparatory to the feeding operation, and control mechanism for said gate, said control mechanism including means engaging said carrier and operated by the movement of said carrier along the axis of said spindle for first automatically opening said gate, during the first portion of the movement of said carrier along the axis of said spindle, so that the film supported by said carrier may be threaded therein, second closing said gate after said carrier has been seated upon said spindle in predetermined relation to said gate, and third latching said carrier in such predetermined relation.

12. In combination, a film supporting carrier, a film handling apparatus having carrier mounting means, film feeding means, an openable gate in which a film supported by said carrier, while said carrier is in operative position upon said mounting means, is maintained during the feeding operation, and means operatively interconnecting said carrier and said gate for latching said gate in closed position and said carrier in operative position upon said mounting means.

13. In combination, a film supporting carrier, a film handling apparatus having carrier mounting means, film feeding means, an openable gate in which a film supported by said carrier is maintained during the feeding operation, means for latching said carrier upon said mounting means in predetermined relation to said apparatus, means for opening said gate, and means for maintaining said gate-opening means ineffective until said latching means shall have been rendered ineffective.

14. In combination, a film supporting carrier, a film handling apparatus having carrier mounting means, film feeding means, an openable gate in which a film supported by said carrier is maintained during the feeding operation, openable means for latching said carrier upon said mounting means in predetermined relation to said apparatus, operable means for closing said gate, and a connection between said gate closing means and said latching means for operating one thereof upon the operation of the other thereof.

15. In combination, a film supporting carrier, a film handling apparatus having carrier mounting means, film feeding means, an openable gate in which a film supported by said carrier is maintained during the feeding operation, means for latching said carrier upon said mounting means in predetermined relation to said apparatus, operable means for releasing said latching means, operable means for opening said gate, and a connection between said gate opening means and said releasing means for operating one thereof upon the operation of the other thereof.

16. In combination, a film supporting carrier, a film handling apparatus having carrier mounting means, film feeding means, an openable gate in which a film supported by said carrier may be maintained so that it may be fed through said apparatus, means for latching said carrier upon said mounting means in feeding relation to said gate, and means operated by the removal of said carrier from said mounting means for releasing said latch and opening said gate.

17. In combination, a film supporting carrier, a film handling apparatus having carrier mounting means, film feeding means, an openable gate in which a film supported by said carrier may be maintained so that it may be fed through said apparatus, means for latching said carrier upon said mounting means in feeding relation to said gate, and means operated by the placing of said carrier upon said mounting means for closing said gate and moving said latch to latching position.

18. In combination, a film supporting carrier, a film handling apparatus having carrier mounting means upon which said carrier may be seated, film feeding means, an openable gate in which a film supported by said carrier may be threaded preparatory to the feeding operation, and means operated by engagement with said carrier for maintaining said gate in open position until said carrier shall have been fully seated upon said mounting means.

19. In combination, a film supporting carrier, a film handling apparatus having carrier mounting means upon which said carrier may be seated, film feeding means, an openable gate through which when closed a film, supported by said carrier when in position upon said mounting means, may be fed by said feeding means, means for opening said gate, and means operated by engagement with said carrier for maintaining said gate in open position until said carrier shall have been removed from said mounting means.

20. In combination, a film supporting carrier, a film handling apparatus having a spindle upon which said carrier may be mounted, feeding means, an openable gate in which a film, supported by said carrier while said carrier is in position upon said spindle, is maintained during the feeding operation, and control means for said gate, said control means comprising a movable member disposed at a distance from said spindle slightly greater than the radius of said carrier and extending from said apparatus in the same direction as said spindle and substantially parallel thereto and embodying upon its end relatively distant from said apparatus an irregular surface formation so constructed that the periphery of the carrier as said carrier is placed upon said spindle moves said member, a spring for maintaining said member in contact with said carrier, and connection between said actuating member and said gate for operating said gate by the movement of said actuating member.

21. In combination, a film supporting carrier having a central bore, a film handling apparatus having a hollow arbor with a slot formed therein parallel to the axis of said arbor upon which said carrier may be mounted, a feeding means, an openable gate in which a film, supported by said carrier while said carrier is in position upon said arbor, is maintained during the feeding operation, and means for operating said gate, said operating means including a movable actuating member mounted upon said apparatus and extending through said hollow arbor and having an irregular surface formation which extends through said slot in said arbor to a position outside of said arbor wherein it engages the periphery of that surface of said central bore of said carrier which is disposed relatively adjacent said apparatus and is moved thereby as said carrier is moved along the axis of said arbor thereby moving said actuating member, and a connection between said actuating member and said gate for operating said gate by the movement of said actuating member.

22. In a film handling apparatus, a film carrier, feeding means, a supporting frame, a gate extending therefrom in a direction normal thereto, said gate comprising a fixed section and a section movable relatively thereto, a spindle extending from said frame in a direction normal thereto and in the same direction as that in which said gate extends for supporting said carrier so that the film supported thereby may be fed through said gate, and means for moving said movable gate section relative to said fixed gate section, said moving means comprising a pivoted actuating member extending from said frame in said same direction as and substantially parallel to said spindle, said actuating member being disposed at a distance from said spindle slightly greater than the radius of said carrier and including a formation engageable with the outer periphery of said carrier as said carrier is placed upon said spindle, a spring for maintaining said formation in operative relation to said carrier, a crank arm attached to said actuating member and movable therewith, a lever for moving said movable section relatively to said fixed section, and a connection between said crank arm and said lever whereby the movement of said crank arm under the influence of said actuating member as it is moved by engagement with said carrier operates said lever and opens and closes said gate.

WARREN DUNHAM FOSTER.
FREDERICK DAVENPORT SWEET.